(12) United States Patent
Yamada et al.

(10) Patent No.: US 8,141,778 B2
(45) Date of Patent: Mar. 27, 2012

(54) IDENTIFICATION DISPLAY DEVICE

(75) Inventors: Yuji Yamada, Sakura (JP); Hiroya Ohnishi, Sakura (JP); Masaki Yamaguchi, Sakura (JP); Kenji Yasuhara, Sakura (JP); Norihiro Momotsu, Sakura (JP)

(73) Assignee: Fujikura Ltd., Tokyo (JP)

( * ) Notice: Subject to any disclaimer, the term of this patent is extended or adjusted under 35 U.S.C. 154(b) by 128 days.

(21) Appl. No.: 12/552,001

(22) Filed: Sep. 1, 2009

(65) Prior Publication Data

US 2010/0090003 A1  Apr. 15, 2010

(30) Foreign Application Priority Data

Oct. 14, 2008  (JP) ................................. 2008-265517

(51) Int. Cl.
*G06K 19/00* (2006.01)
(52) U.S. Cl. ........ 235/385; 235/375; 235/435; 235/439; 235/454; 235/462.11
(58) Field of Classification Search .................. 235/375, 235/385, 454; 705/28
See application file for complete search history.

(56) References Cited

U.S. PATENT DOCUMENTS

| 5,371,680 A | * | 12/1994 | Anno et al. ..................... 705/30 |
| 6,010,064 A | * | 1/2000 | Umeda et al. ................. 235/375 |
| 2002/0184497 A1 | * | 12/2002 | Gage et al. .................... 713/168 |
| 2003/0058262 A1 | * | 3/2003 | Sato et al. ..................... 345/690 |

FOREIGN PATENT DOCUMENTS

| JP | 62-186698 A | 8/1987 |
| JP | 01-256410 A | 10/1989 |
| JP | 03-249003 A | 11/1991 |
| JP | 2005-206268 A | 8/2005 |
| JP | 2005-350252 A | 12/2005 |
| WO | WO 2009047693 A2 * | 4/2009 |

* cited by examiner

*Primary Examiner* — Michael G Lee
*Assistant Examiner* — Matthew Mikels
(74) *Attorney, Agent, or Firm* — Sughrue Mion, PLLC

(57) ABSTRACT

An identification display device which is provided in a work unit in which a plurality of work locations are arranged in rows, and which displays for identifying a designated location selected from the work locations, the identification display device includes a database which stores address information of the respective work locations; light-display section which is provided respectively on each of the work locations, and which emits a visible light which contains the address information of the work location in which the light-display section is arranged; a photoreceptor which transmits a photoreception signal which contains at least the address information contained in the light from the light-display section, when the light is received; and a confirmation section which receives the photoreception signal from the photoreceptor, and determines whether or not the address information contained in the photoreception signal matches the address information of the designated location obtained from the database.

19 Claims, 3 Drawing Sheets

IDENTIFICATION DISPLAY DEVICE

BACKGROUND OF THE INVENTION

1. Field of the Invention

The present invention relates to a device which displays a designated work location (i.e., storage space) in a work unit (for example, article storage shelves on which a plurality of storage spaces which are capable of storing article are arranged in rows) in which a plurality of work locations are arranged in rows, and more specifically, to an identification display device which makes it possible for work to be carried out certainly in a designated work location.

Priority is claimed on Japanese Patent Application No. 2008-265517, filed Oct. 14, 2008, the contents of which are incorporated herein by reference.

2. Description of Related Art

In order to perform, for example, inventory control of article on article storage shelves (i.e., work units) on which a plurality of storage spaces which are capable of storing article are provided in rows, incoming and outgoing article is controlled using labels on which barcodes are recorded (see, for example, Japanese Unexamined Patent Application, First Publication No. 2005-206268).

There have been calls with regard to these article storage shelves for improvements in work efficiency in the tasks of storing and retrieving article, and for preventing work errors.

The present invention was conceived in view of the above described circumstances and it is an object thereof to provide an identification display device which makes it possible to improve work efficiency when carrying out work in work locations designated within a work unit, and which is able to prevent work errors.

SUMMARY OF THE INVENTION

The present invention employs the following aspects in order to solve the above described problems and achieve the above described objects.

(1) An identification display device of the present invention which is provided in a work unit in which a plurality of work locations are arranged in rows, and which displays for identifying a designated location selected from the work locations, the identification display device includes: a database which stores address information of the respective work locations; light-display section which is provided respectively at each of the work locations, and which emits a visible light which contains the address information of the work location in which that particular light-display section is arranged; a photoreceptor which transmits a photoreception signal which contains at least the address information contained in the light from the light-display section, when the light is received; and a confirmation section which receives the photoreception signal from the photoreceptor, and determines whether or not the address information contained in the photoreception signal matches the address information of the designated location which is obtained from the database.

According to the identification display device described in (1), there are provided light-display section which is provided in the work locations and are able to display positions using light, a photoreceptor which receives light from the light-display section, and a confirmation section (i.e., a confirmation unit) which confirms whether a currently operating work location is the designated location, based on the photoreception signal transmitted from the photoreceptor. According to this structure, because the work is proceed after the position of the work location is accurately displayed by confirming the light from the light-display section, it is possible to increase work efficiency. In addition, by performing the determination of the confirmation section, it is possible to prevent errors of selecting the designated location from the respective work locations.

Moreover, because the light-display section combine a position display function with an address information providing function, the structure of the identification display device can be simplified which enables reductions in both manufacturing costs and installation costs to be achieved.

(2) In the identification display device described above in (1), it is also possible to employ a structure in which the light emitted from the light-display section contains a start bit pattern which represents that a bit pattern has started, an address bit pattern which represents the address information of the work location in which that light-display section is arranged, and an end bit pattern which represents that the bit pattern has ended; and in which the confirmation section determines whether or not the start bit pattern and the end bit pattern are contained in the photoreception signal.

(3) In the identification display device described above in (2), it is also possible to employ a structure in which the light emitted from the light-display section contains a parity bit, and the confirmation section determines whether or not an error exists in the parity bits of the photoreception signal.

(4) In the identification display device described above in (2), it is also possible to employ a structure in which the address bit pattern is encoded, and the confirmation section decodes the address bit pattern and determines whether or not an error exists in the photoreception signal which contains the decoded address bit pattern.

(5) In the identification display device described above in (3), it is also possible to employ a structure in which the address bit pattern is encoded, and the confirmation section decodes the address bit pattern and determines whether or not an error exists in the photoreception signal which contains the decoded address bit pattern.

(6) In the identification display device described above in (2), it is also possible to employ a structure in which the light emitted from the light-display section contains an identification information of the designated location, and in which, when the confirmation section determines whether or not the work location is the designated location, the identification information obtained from the photoreception signal is being referred.

(7) In the identification display device described above in (3), it is also possible to employ a structure in which the light emitted from the light-display section contains an identification information of the designated location, and in which, when the confirmation section determines whether or not the work location is the designated location, the identification information obtained from the photoreception signal is being referred.

(8) In the identification display device described above in (1), it is also possible to employ a structure in which of the respective work locations other than the designated location, the light-display section of the work locations which are positioned adjacent to the designated location are also turned on.

(9) In the identification display device described above in (2), it is also possible to employ a structure in which of the respective work locations other than the designated location, the light-display section of the work locations which are positioned adjacent to the designated location are also turned on.

(10) In the identification display device described above in (3), it is also possible to employ a structure in which of the respective work locations other than the designated location, the light-display section of the work locations which are positioned adjacent to the designated location are also turned on.

(11) In the identification display device described above in (1), it is also possible to employ a structure in which the work unit is an article storage shelf which includes a plurality of storage spaces in which an article is stored as the respective work locations.

(12) In the identification display device described above in (2), it is also possible to employ a structure in which the work unit is an article storage shelf which includes a plurality of storage spaces in which an article is stored as the respective work locations.

(13) In the identification display device described above in (3), it is also possible to employ a structure in which the work unit is an article storage shelf which includes a plurality of storage spaces in which an article is stored as the respective work locations.

(14) In the identification display device described above in (1), it is also possible to employ a structure in which the work unit is a book shelf which includes a plurality of storage spaces in which a book is stored as the respective work locations.

(15) In the identification display device described above in (2), it is also possible to employ a structure in which the work unit is a book shelf which includes a plurality of storage spaces in which a book is stored as the respective work locations.

(16) In the identification display device described above in (3), it is also possible to employ a structure in which the work unit is a book shelf which includes a plurality of storage spaces in which a book is stored as the respective work locations.

(17) In the identification display device described above in (1), it is also possible to employ a structure in which the work unit is a delivery item storage shelf which includes a plurality of storage spaces in which a postal matter is stored as the respective work locations.

(18) In the identification display device described above in (2), it is also possible to employ a structure in which the work unit is a delivery item storage shelf which includes a plurality of storage spaces in which a postal matter is stored as the respective work locations.

(19) In the identification display device described above in (3), it is also possible to employ a structure in which the work unit is a delivery item storage shelf which includes a plurality of storage spaces in which a postal matter is stored as the respective work locations.

BEST MODE FOR CARRYING OUT THE INVENTION

Hereinafter, an identification display device according to an embodiment of the present invention will be described with reference to the drawings based on an example in which it is applied to an article storage shelf.

Figure 1:
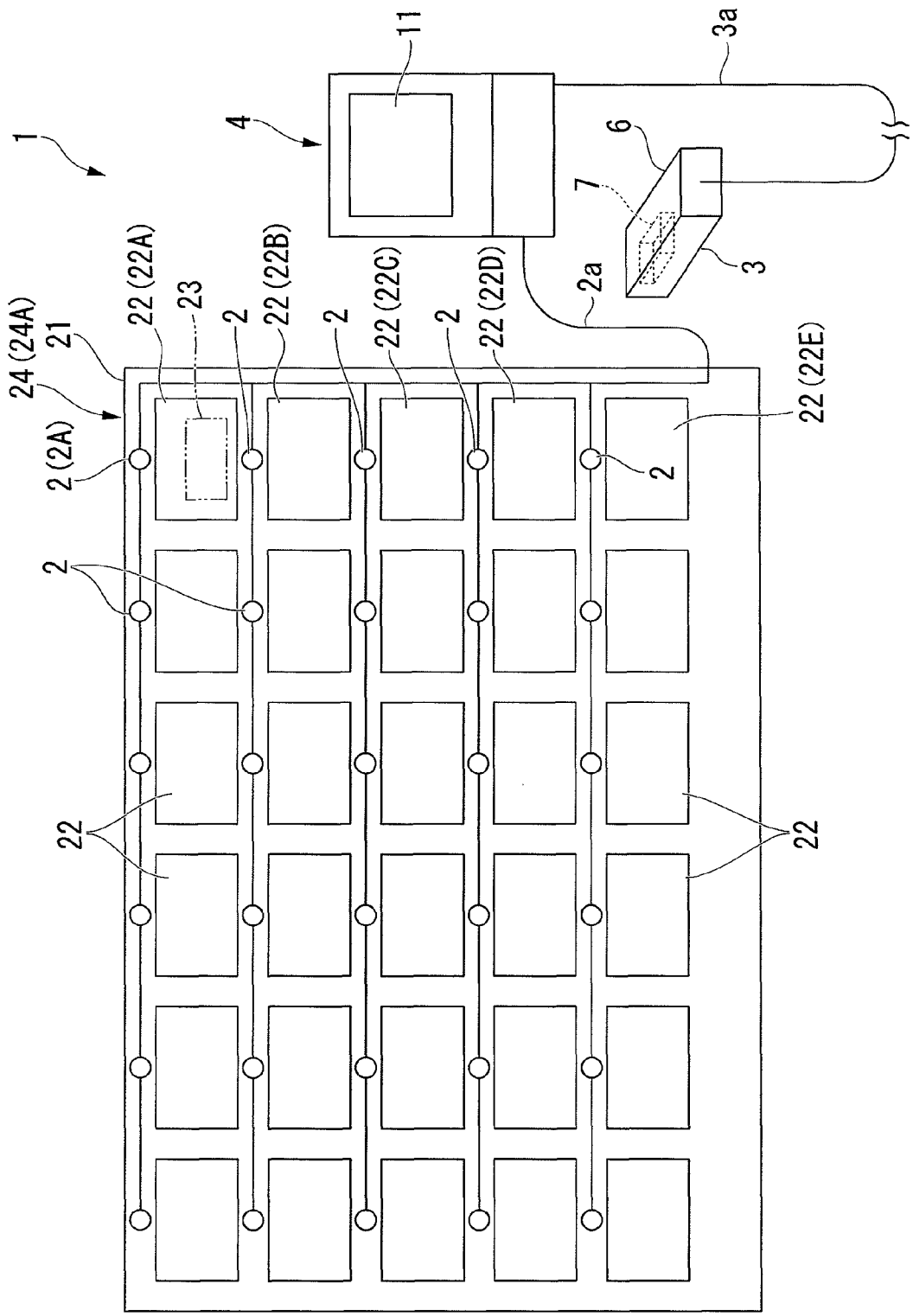
FIG. 1 is a pattern view showing an article storage shelf provided with the identification display device according to an embodiment of the present invention.
Figure 2:
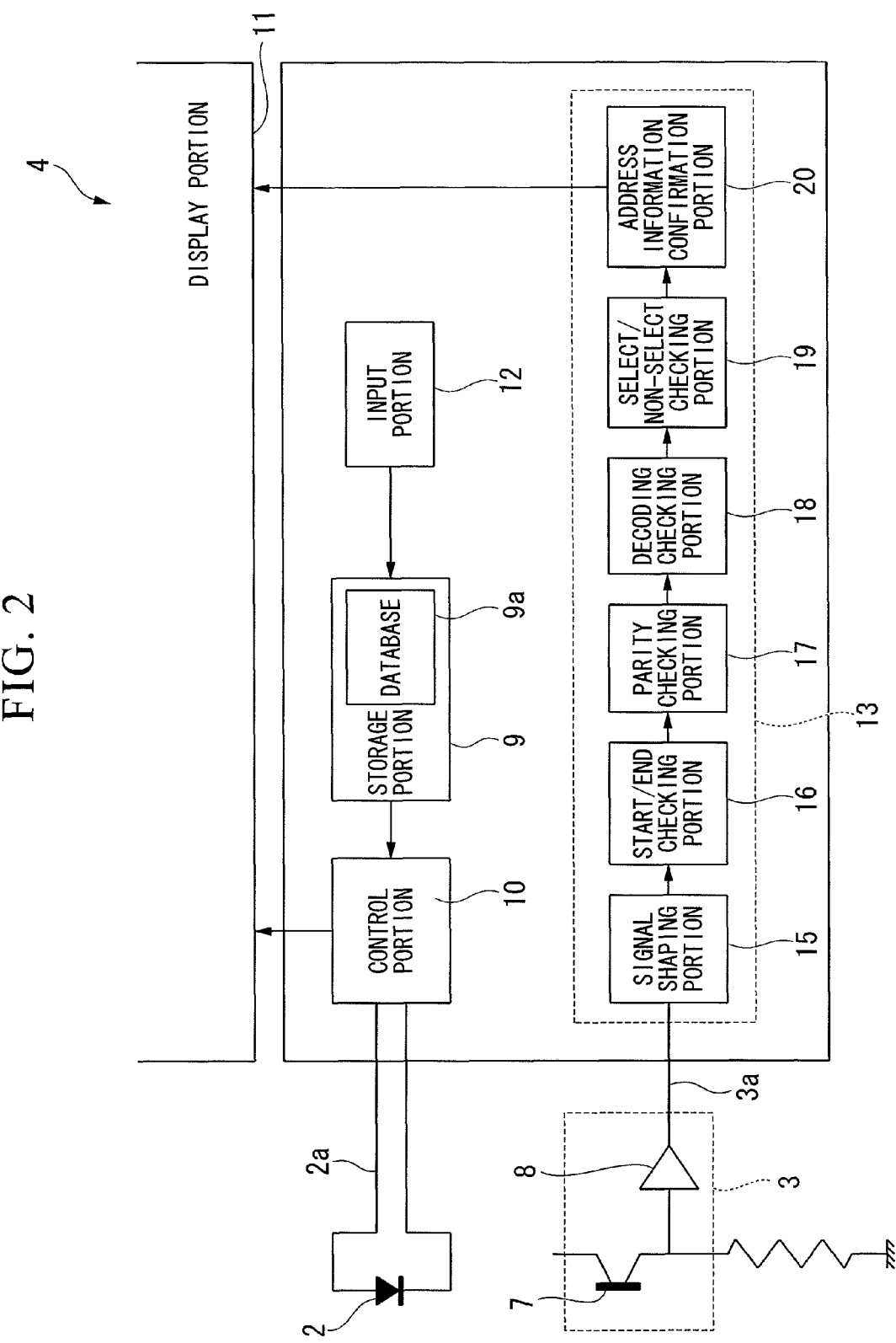
FIG. 2 is a block drawing showing principal portions of this identification display device.
Figure 3:
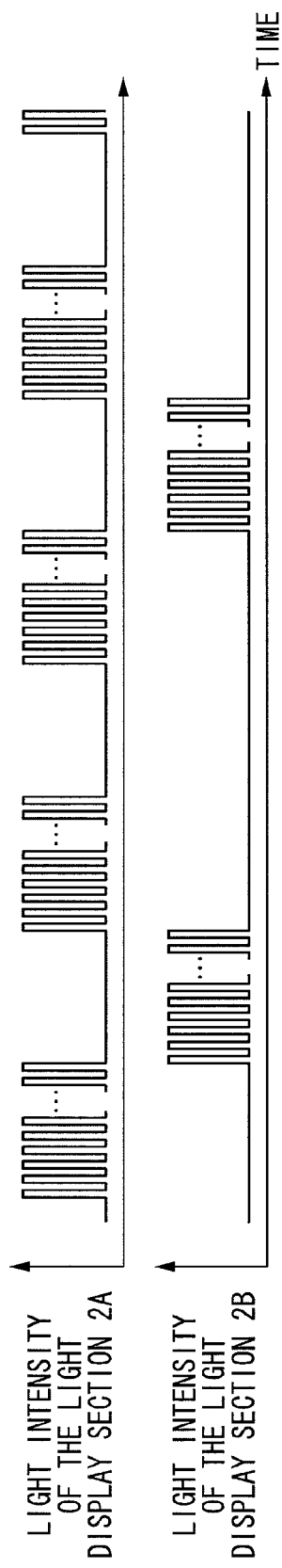
FIG. 3 is a graph showing an example of a pattern of light emitted by a light display section of this identification display device, in which the vertical axis on the top portion of the graph shows a light intensity of a light-display section 2A, and the vertical axis on a bottom portion of the graph shows a light intensity of a light-display section 2B. The horizontal axis shows the time for both the top and bottom portions of the graph.

FIG. 1 is a pattern view showing an article storage shelf 21 provided with an identification display device 1 of the present embodiment is provided. FIG. 2 is a block drawing showing principal portions of the identification display device 1. FIG. 3 is a view showing examples of patterns of light emitted by light-display sections (2A and 2B) of this identification display device 1.

As shown in FIG. 1, an article storage shelf 21 is a work unit in which a plurality of storage spaces 22 (i.e., work locations) are arranged in rows. The article storage shelf 21 can be used, for example, in a warehouse or factory or the like, and is able to store article (stock, goods) 23 such as components of industrial products or merchandise within respective storage spaces 22 which are used for the secure storage of this article. Note that, in the example shown in the drawing, the storage spaces 22 are arranged in a plurality of rows and on a plurality of levels (namely, the respective storage spaces 22 are arranged in a matrix extending in both the horizontal direction and the vertical direction).

The identification display device 1 is provided with: a plurality of light-display sections 2 which are provided so as to correspond to the positions of each one of the storage spaces 22 of the article storage shelf 21; a photoreceptor 3 which is able to move to any desired light-display section 2 from among these light-display sections 2, and receives light emitted by the light-display section 2 to which it has moved and then transmits a photoreception signal; and a confirmation section (i.e., a confirmation unit) 4 which confirms whether or not the storage space 22 in which the light-display section 2 which is emitting the light received by this photoreceptor 3 is provided is the selected designated storage space 22 (i.e., is the designated location—referred to in the description below as a designated storage space 22A).

The light-display sections 2 are provided with light emitting element which emits visible light such as light emitting diodes (LED) and laser diodes (LD). In the example shown in FIG. 1, the light-display sections 2 are arranged respectively on the shelves directly above the respective storage spaces 22. That is, each light-display section 2 is arranged so as to correspond to the storage space 22 directly beneath it.

Each light-display section 2 is connected, for example, via wiring 2a to the confirmation section 4. Light which includes address information of the corresponding storage space 22 can be emitted based on light emission signals received from the confirmation section 4 via the wiring 2a. Note that it is also possible to connect together the respective light-display sections 2 and the confirmation section 4 wirelessly (using radio signals) instead of using the wiring 2a.

At this time, as a result of the light-display sections 2 emitting light which is visible by an operator (not shown), the position of the designated storage space 22A can be identifiably displayed.

As is shown in FIG. 1 and FIG. 2, the photoreceptor 3 is provided with a housing 6, a photoreceptor element 7 and amplifier 8 which are housed inside the housing 6, and wiring 3a which connects the photoreceptor element 7 and amplifier 8 to the confirmation section 4. In addition, when an operator is manually holding the photoreceptor 3 and has moved it close to any one of the light-display sections 2, the light emitted from that light-display section 2 can be received by the photoreceptor element 7.

For example, a photodiode (PD) or phototransistor (PT) or the like can be used for the photoreceptor element 7. When the photoreceptor element 7 receives light emitted from a light-display section 2, it is able to transmit a predetermined photoreception signal to the confirmation unit 4 via the wiring 3a. Note that it is also possible to connect together the photoreceptor element 7 and amplifier 8 and the confirmation section 4 wirelessly (using radio signals) instead of using the wiring 3a.

It is preferable for the housing 6 to have a light-shielding structure which does not allow external light (for example, illumination light, and light from light-display sections 2 other than the targeted light-display section 2) to enter inside it.

As is shown in FIG. 2, the confirmation section 4 has a storage portion 9 which stores a database 9a which includes address information of each storage space 22; a control portion 10 which controls the light-display sections 2; a display portion 11 which displays various types of information from this control portion 10 and from an address information confirmation portion 20; an input portion 12 which an operator uses to input information into the storage portion 9; and a determination portion 13 which receives an identification signal obtained from the photoreception signal and address information obtained from the database 9a of the storage portion 9 via the control portion 10, and determines whether or not the address information obtained from the identification signal matches the address information obtained from the database 9a. Note that, in FIG. 2, only one of the plurality of light-display sections 2 is shown in order to simplify the description.

The database 9a of the storage portion 9 stores address information of each storage space 22.

Next, a method of using the identification display device 1 will be described.

The confirmation section 4 sends an optical signal which includes address information of each one of the storage spaces 22 to the light-display sections 2 at the positions which correspond to each one of the storage spaces 22 via the wiring 2a. The light-display sections 2 which receive this optical signal emit light which is identifiable by an operator and which includes address information of the storage spaces 22.

As is shown in FIG. 1, when, for example, article 23 is being stored in the designated storage space 22A (i.e., in a designated location), the light-display section 2 at the position which corresponds to the designated storage space 22A emits light which includes address information of the designated storage space 22A. At this time, by using visible light for this light, the operator is easily able to visually determine the position of the designated storage space 22A. Because of this, the operator can be easily guided to the position of the designated storage space 22A, and the efficiency of the storage task can be improved.

Note that, in the example shown in the drawing, the storage space 22 on the top right of the article storage shelf 21 is the designated storage space 22A, and a light-display section 2A which corresponds to this designated storage space 22A emits light which includes address information of the designated storage space 22A.

Light emitted from each of the light-display sections 2 preferably includes, for example, the following bit patterns (a) through (c) from one frame.

Bit pattern (a): shows the start of the bit patterns.

Bit pattern (b): shows address information of the storage space 22 corresponding to the light-display section 2 which is emitting the light (hereinafter, referred to as the currently operating storage space 22).

Bit pattern (c): shows the end of the bit patterns.

It is preferable for these bit patterns to be formed by pulse signals which are in synchronization with a predetermined reference clock.

Bit pattern (b) which shows address information of the currently operating storage space 22 is preferably encoded. A commonly used method such as, for example, 4B 5B encoding (conversion) in which groups of 4 bits are converted into 5 bit patterns, or 8B 10B encoding (conversion) in which groups of 8 bits are converted into 10 bit patterns can be used for the encoding.

By performing encoding, because it is possible to prevent the light-display sections 2 being concentrated in an on state or in an off state, flickering and the like can be prevented. Accordingly, adjusting of the ease of visibility of the light-display sections 2 is made simpler. For example, when the position of the designated storage space 22A is being displayed, the light-display section 2 emits light which does not flicker and is easily visible, while because it is possible to make the light-display sections 2 emit light which is relatively difficult to be visible in the storage spaces 22 other than the designated storage space 22A, it is possible to prevent an operator mistakenly performing a task in any storage space 22 other than the designated storage space 22A.

In addition to the bit patterns (a) through (c), the light emitted by the light-display sections 2 may also include a bit pattern (d), that is, a parity bit for the above described bit pattern which shows the address information.

Furthermore, in addition to the bit patterns (a) through (d), the light emitted by the light-display sections 2 may also include a bit pattern (e), namely, may include identification information of the designated storage space 22A.

For example, if a predetermined bit of light emitted by the light-display section 2 which corresponds to the designated storage space 22A is '1', and predetermined bits of light emitted by the light-display sections 2 which correspond to the other storage spaces 22 is '0', then this bit forms the identification information of the designated storage space 22A. As a result of this, it becomes possible to more reliably confirm whether or not the currently operating storage space 22 is the designated storage space 22A.

When all of the above described bit patterns (a) through (e) are employed, the sequence thereof may be, for example, (1) the bit pattern (a) which shows the start, (2) the bit pattern (e) which shows identification information of the designated storage space 22A, (3) the bit pattern (b) which shows address information of the designated storage space 22A, (4) the parity bit (d), and (5) the bit pattern (c) which shows the end.

It is preferable for the light emitted by light-display sections 2 which correspond to storage spaces 22 other than the designated storage space 22A to be difficult to see compared with the light emitted by the light-display section 2 of the designated storage space 22A, or to not be visible at all. In this case, an operator is able to easily specify the designated storage space 22A.

The ease of visibility of the light emitted by the light-display sections 2 can be adjusted by adjusting the interval or the like of the light emissions. For example, as is shown in FIG. 3, by making the frame interval in a light-display section 2A shorter than the interval in a light-display section 2B, it is possible to make the light of the light-display section 2A more easily visible than the light of the light-display section 2B.

In this manner, by adjusting the lighting pattern of the light-display sections 2, it is possible to set the ease of visibility to a desired level, and it is thereby possible to improve the function of guiding an operator to the designated storage space 22A.

In the identification display device 1, by causing the light-display sections 2 of those storage spaces 22 excluding the designated storage space 22A which are positioned adjacent to the designated storage space 22A, for example, in FIG. 1, of the storage spaces 22B through 22E which belong to the row 24A which includes the designated storage space 22A to emit light, the general position of the designated storage space 22A can be displayed.

It is preferable for a different lighting pattern to be used for the light emitted by the respective light-display sections 2 of the storage spaces 22B through 22E than the lighting pattern of the light emitted from light-display section 2 of the designated storage space 22A as this enables an operator to distinguish between the storage spaces 22B through 22E and the designated storage space 22A. For example, a method in which the light-display section 2 of the designated storage space 22A is continuously on, while the light-display sections 2 of the storage spaces 22B through 22E are flashing on and off may be employed as a method of distinguishing between them.

By displaying the positions of the storage spaces 22B through 22E which are located adjacent to the designated storage space 22A using light, a plurality of display portions 2 end up being turned on. Because of this, even if there are a large number of storage spaces 22, an operator is able to ascertain roughly the position of the designated storage space 22A because of the fact that the respective light-display sections 2 of the storage spaces 22B through 22E are also turned on. Furthermore, the operator is able to immediately and easily determine the designated storage space 22A which has a relatively higher degree of visibility than the storage spaces 22B through 22E. Accordingly, because the operator can be guided immediately to the designated storage space 22A, the work efficiency of the operator can be improved.

It is possible for there to be either one or a plurality of the storage spaces 22 which are positioned adjacent to the designated storage space 22A and whose position is displayed using light.

As is shown in FIG. 1, an operator places article 23 in the storage space 22 which corresponds to the light-display section 2 which is emitting light (i.e., in the designated storage space 22A), and also receives light from the light-display section 2 of this designated storage space 22 using the photoreceptor portion 3. When the photoreceptor element 7 receives light, it transmits a photoreception signal. This photoreception signal is amplified by the amplifier 8 and is sent to the determination portion 13 of the confirmation section 4.

As is shown in FIG. 2, in a signal shaping portion 15 of the determination portion 13, the waveform of the photoreception signal is shaped so as to match the reference clock and is sent to the next step.

In the signal shaping portion 15, reception signals are sampled by higher clocks than the reference clock, and only when the sampled signals satisfy predetermined conditions are their waveforms shaped so as to match the reference clock and form identification signals (i.e., photoreception signals). These identification signals are then sent to the next step. As a result, the effects of disturbance elements such as illumination light which leaks in from the light-shielded portion (not shown) of the housing 6 of the photoreceptor portion 3 are eliminated, and a reliable confirmation operation can be performed.

Next, in a start/end checking portion 16, a determination is made as to whether or not bit patterns which show a start and an end are contained in the identification information. If they are included, the identification signal from the signal shaping portion 15 (i.e., the photoreception signal) is sent to the next step. If, however, bit patterns which show a start and an end are not contained in the identification information, then signal transmission from the start/end checking portion 16 is not performed.

If bit patterns showing a start and a stop can be confirmed, then there is a high possibility that the address information of a storage space 22 which is between this start bit pattern and this end bit pattern is valid.

By only transmitting signals when bit patterns are confirmed before and after the bit pattern showing the address information, it is possible to prevent abnormal signals such as signals having missing portions (for example, missing front half portions or rear half portions of a signal) which are caused by variations in the light level of the photoreceptor portion 3 resulting from unsteady handling by the operator being sent to the next step, and it is thereby possible to improve the reliability of a confirmation task performed by the determination portion 13.

In a parity checking portion 17, a determination is made as to whether or not an error exists in the parity of the bit pattern which shows the address information of the designated storage space 22A (this is known as parity checking). If no error exists, the identification signal (i.e., photoreception signal) from the aforementioned start/end checking portion 16 is sent to the next step. By performing a parity check, the confirmation task can be performed more reliably.

Note that in the present invention, the error checking method is not limited to parity checking and another error checking method such as, for example, CRC (cyclic redundancy checking) may also be used.

In a decoding checking portion 18, the above described encoded bit pattern is decoded, and a determination is then made as to whether or not an error exists in the decoded bit pattern. If no error exists, the identification signal (i.e., the photoreception signal) from the aforementioned parity checking portion 17 is sent to a select/non-select checking portion 19.

In the select/non-select checking portion 19, whether or not identification information of the designated storage space 22A is included in the identification signal is confirmed, and this identification signal is then sent to an address information confirmation portion 20. Namely, the select/non-select checking portion 19 sends this identification signal to the address information confirmation portion 20 both when identification information of the designated storage space 22A is included and when it is not included in the identification signal.

In the address information confirmation portion 20, the address information of the designated storage space 22A obtained from the identification signal is compared with address information of the designated storage space 22A acquired from the database 9a, and a determination is made as to whether or not these two match.

In the select/non-select checking portion 19, whether or not identification information of the designated storage space 22A is included in the identification signal can be confirmed, and also when address information of this storage space 22 currently being used is found by the address information confirmation portion 20 to match the address information of the designated storage space 22A in the database 9a, then it is accepted that the currently operating storage space 22 is the designated storage space 22A. This result (i.e., [OK]) and the address information of this currently operating storage space 22 is displayed on the display portion 11. Namely, when identification information is contained in the identification signal, and the address information from this identification signal matches address information from the database 9a, then an [OK] result is obtained.

If it is determined by the select/non-select checking portion 19 that identification information of the designated storage space 22A is not included in the identification signal, and it is determined by the address information confirmation portion 20 that the address information of the currently operating storage space 22 does not match the address information of the designated storage space 22A, then it is accepted that this currently operating storage space 22 is not the designated storage space 22A, and this result (i.e., [NG]) and the address information of the currently operating storage space 22 is displayed on the display portion 11. Namely, if identification information is not included in the identification signal and also the address information from the identification signal does not match the address information from the database 9a, then an [NG] result is obtained.

If a result other than an [OK] or [NG] result is obtained for the determination as to whether or not identification information of the designated storage space 22A exists and for the determination as to whether or not the address information matches, then neither the result nor the address information are displayed.

In this manner, by checking not only whether or not the address information matches, but by also checking whether or not identification information of the designated storage space 22A exists, it is possible to more reliably confirm whether or not the currently operating storage space 22 is the designated storage space 22A.

The identification display device 12 can also be used when article 23 is being retrieved from a particular storage space 22. Namely, an emitted light signal which includes identification information of the designated storage space 22A which is targeted for retrieval is sent from the confirmation section 4 to the light-display section 2 located at a position which corresponds to that storage space 22, and by causing this light-display section 2 to emit light, the position of the designated storage space 22A is displayed.

An operator retrieves the article 23 and also uses the photoreceptor 3 to receive light from the light-display section 2 corresponding to the storage space 22 currently being used. This photoreception signal is then sent to the confirmation section 4 and it is possible to easily confirm that this currently operating storage space 22 is the designated storage space 22A via the confirmation task performed by the confirmation section 4.

When the above described confirmation task is being performed when article 23 is being stored on or retrieved from a storage space 22, a storage/retrieval record can be stored in the storage portion 9 of the confirmation section 4. Keeping a record of the working history is more effective in preventing work errors.

In the identification display device 1, there are arranged light-display sections 2 which are arranged in the storage spaces 22 and are able to display positions by light, a photoreceptor 3 which receives light from the light-display sections 2, and a confirmation section 4 which, based on photoreception signals received from the photoreceptor 3, confirms that the currently operating storage space 22 is the designated storage space 22A. As a result, the work efficiency of an operator who is performing a task of storing or retrieving article 23 is improved due to the position of the designated storage space 22A being displayed. In addition, it is possible to prevent work errors because of the confirmation operation performed by the confirmation section 4.

Moreover, because the light-display sections 2 combine a position display function with an address information providing function, the device structure can be simplified which enables a reduction in cost to be achieved.

Furthermore, by checking the photoreception signals in the determination portion 13, the effects of disturbance elements such as illumination light and light from other light-display sections 2 are eliminated, and a reliable confirmation operation can be performed.

In the example described above a case is illustrated in which the present invention is applied to article storage shelves which can be used when components of industrial products or merchandise are (securely) stored in a warehouse or factory or the like, however, the present invention is not limited to this and can also be applied to other applications.

For example, the present invention can also be applied to bookshelves in a library.

If this is described using FIG. 1, light-display sections 2 are arranged at positions which correspond to the respective storage spaces 22 on a bookshelf 21 (i.e., a work unit) in a library. When a book 23 (or another publication) is being stored on or retrieved from a designated storage space 22A, the position of the designated storage space 22A can be displayed in accordance with the above described method, and it can be confirmed that the storage space 22 where the book is being stored or retrieved from is the designated storage space 22A. By doing this, the work efficiency of the operator is improved and work errors made by the operator can be prevented.

Moreover, the present invention can also be applied to post boxes (i.e., delivery item storage shelves) used for holding postal matter (postal deliveries) and the like in collective housing blocks.

If this is described using FIG. 1, light-display sections 2 are arranged at positions which correspond to the respective postal delivery storage spaces 22 of each dwelling in a post box 21 (i.e., work unit) of a collective housing block. When a postal item is being delivered to a designated storage space 22A, the position of the designated storage space 22A can be displayed in accordance with the above described method, and it can be confirmed that the storage space 22 where the postal item is being delivered is the designated storage space 22A. By doing this, the work efficiency of the operator is improved and work errors made by the operator can be prevented. In addition, a record of the delivery can be left in the storage portion 9 of the confirmation section 4.

Furthermore, the present invention can also be applied to a structure which is made up of a plurality of routes (i.e., roads, railway lines, and the like). In this case, light-display sections are arranged on road signs or the like which are arranged on each one of the routes, and when a moving object (such as a vehicle or train) is moving towards a designated route, the position of that designated route can be displayed in accordance with the above described method. In addition, the confirmation section is able to confirm that the route along which the moving object is advancing is the designated route.

Note that the structure which is made up of a plurality of routes (i.e., roads, railway lines, and the like) corresponds to the work unit, and the routes correspond to the work locations.

While embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

The invention claimed is:

1. An identification display device which is provided in a work unit in which a plurality of work locations are arranged in rows, and which displays for identifying a designated location selected from the work locations, the identification display device comprising:
   a database which stores address information of the respective work locations;
   light-display section which is provided respectively on each of the work locations, and which emits a visible light which contains the address information of the work location in which the light-display section is arranged, the visible light including a plurality of frames and a frame interval between the frames, the visible light containing an address bit pattern representing the address information of the work location in which the light-display section is arranged, a light intensity of the address bit pattern varying with time;
   a photoreceptor which transmits a photoreception signal which contains at least the address information contained in the visible light from the light-display section, when the visible light is received; and
   a confirmation section which receives the photoreception signal from the photoreceptor, and determines whether or not the address information contained in the photoreception signal matches the address information of the designated location which is obtained from the database
   wherein,
   the ease of visibility of the visible light emitted from the light-display section of the designated location selected from the work locations is set so as to have a relatively higher degree of visibility than that of the other work locations except the designated location by adjusting the lighting pattern of the light-display section so as to make the frame interval of the designated location shorter than the frame interval of other work locations except the designated location.

2. The identification display device according to claim 1, wherein:
   the visible light emitted from the light-display section contains a start bit pattern which represents that a bit pattern has started, and an end bit pattern which represents that the bit pattern has ended; and
   the confirmation section determines whether or not the start bit pattern and the end bit pattern are contained in the photoreception signal.

3. The identification display device according to claim 2, wherein:
   the visible light emitted from the light-display section contains parity bits; and
   the confirmation section determines whether or not an error exists in the parity bits of the photoreception signal.

4. The identification display device according to claim 2, wherein: the address bit pattern is encoded; and
   the confirmation section decodes the address bit pattern, and determines whether or not an error exists in the photoreception signal which contains the decoded address bit pattern.

5. The identification display device according to claim 3, wherein: the address bit pattern is encoded, and
   the confirmation section decodes the address bit pattern, and determines whether or not an error exists in the photoreception signal which contains the decoded address bit pattern.

6. The identification display device according to claim 2, wherein: the visible light emitted from the light-display section contains an identification information of the designated location; and
   when the confirmation section determines whether or not the work location is the designated location, the identification information obtained from the photoreception signal is being referred.

7. The identification display device according to claim 3, wherein: the visible light emitted from the light-display section contains an identification information of the designated location; and
   when the confirmation section determines whether or not the work location is the designated location, the identification, information obtained from the photoreception signal is being referred.

8. The identification display device according to claim 1, wherein
   among the respective work locations except the designated location, the light-display section of the work locations which are positioned adjacent to the designated location are also turned on.

9. The identification display device according to claim 2, wherein
   among the respective work locations except the designated location, the light-display section of the work locations which are positioned adjacent to the designated location are also turned on.

10. The identification display device according to claim 3, wherein
    among the respective work locations except the designated location, the light-display section of the work locations which are positioned adjacent to the designated location are also turned on.

11. The identification display device according to claim 1, wherein the work unit is an article storage shelf which includes a plurality of storage spaces in which an article is stored as the respective work locations.

12. The identification display device according to claim 2, wherein the work unit is an article storage shelf which includes a plurality of storage spaces in which an article is stored as the respective work locations.

13. The identification display device according to claim 3, wherein the work unit is an article storage shelf which includes a plurality of storage spaces in which an article is stored as the respective work locations.

14. The identification display device according to claim 1, wherein the work unit is a book shelf which includes a plurality of storage spaces in which a book is stored as the respective work locations.

15. The identification display device according to claim 2, wherein
    the work unit is a book shelf which includes a plurality of storage spaces in which a book is stored as the respective work locations.

16. The identification display device according to claim 3, wherein: the work unit is a book shelf which includes a plurality of storage spaces in which a book is stored as the respective work locations.

17. The identification display device according to claim 1, wherein the work unit is a delivery item storage shelf which includes a plurality of storage spaces in which a postal matter is stored as the respective work locations.

18. The identification display device according to claim 2, wherein, the work unit is a delivery item storage shelf which includes a plurality of storage spaces in which a postal matter is stored as the respective work locations.

19. The identification display device according to claim 3, wherein the work unit is a delivery item storage shelf which includes a plurality of storage spaces in which a postal matter is stored as the respective work locations.

* * * * *